June 7, 1955     S. LARACH     2,710,262
METHOD OF FORMING A PHOSPHOR SCREEN
Filed June 28, 1952     2 Sheets-Sheet 1
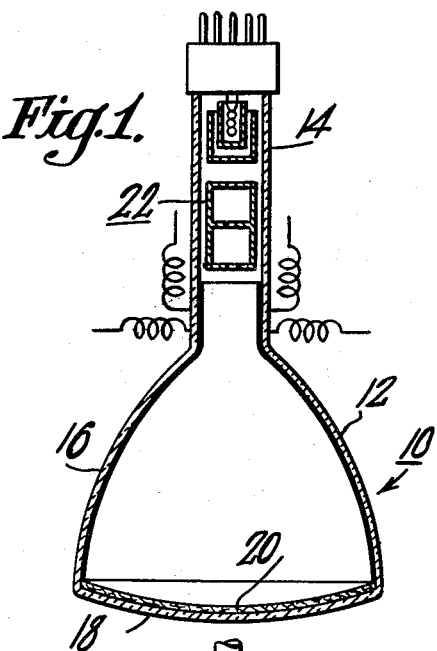
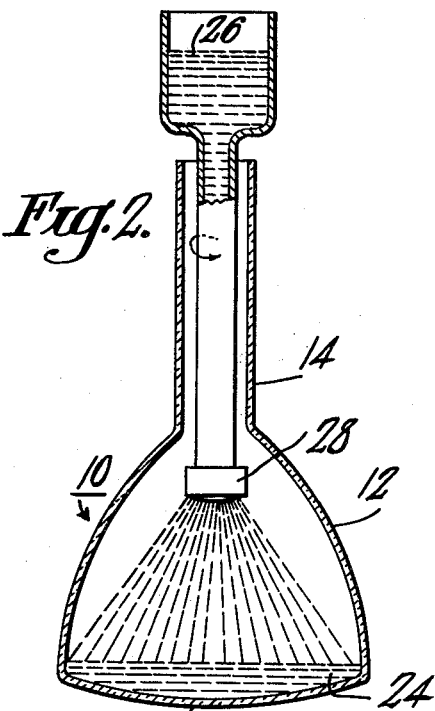
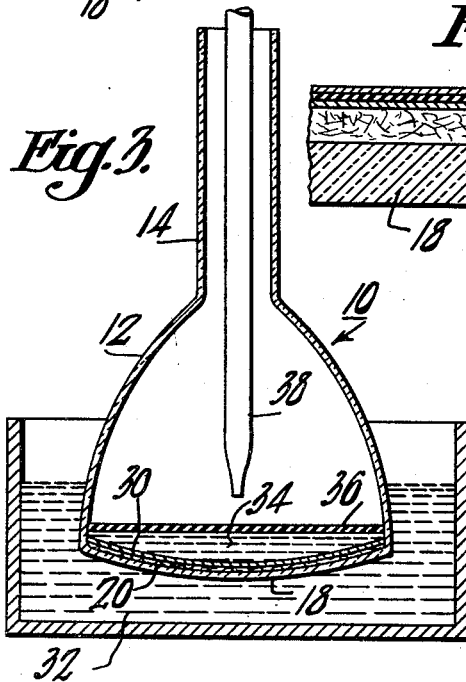
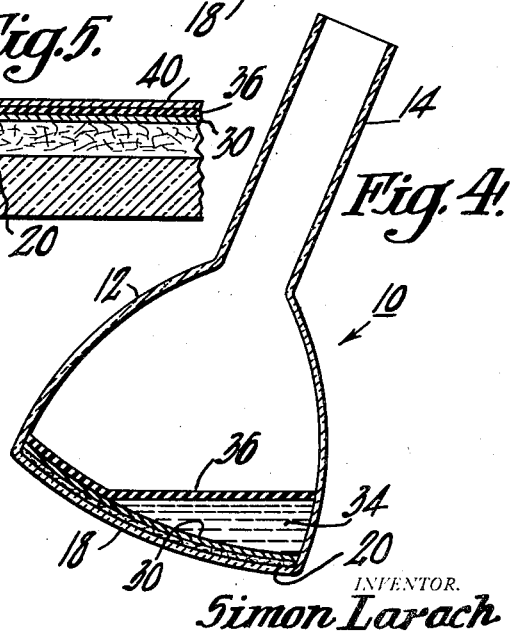
INVENTOR.
Simon Larach
BY William A. Zalesak
ATTORNEY June 7, 1955  S. LARACH  2,710,262
METHOD OF FORMING A PHOSPHOR SCREEN
Filed June 28, 1952  2 Sheets—Sheet 2

INVENTOR.
Simon Larach
BY William A. Zalesak
ATTORNEY

United States Patent Office 2,710,262
Patented June 7, 1955

2,710,262

METHOD OF FORMING A PHOSPHOR SCREEN

Simon Larach, New Brunswick, N. J., assignor to Radio Corporation of America, a corporation of Delaware Application June 28, 1952, Serial No. 296,129

9 Claims. (Cl. 117—33.5)

This invention relates to a method of preparing a phosphor screen in a cathode ray tube and particularly to an improved method for forming and coating a phosphor screen comprising a water sensitive phosphor.

In one system of color television presently employed for televising films, a "flying-spot" cathode ray tube is used as a light source to scan a film negative, the light transmitted through the negative then being divided into three color components, red, blue, and green. These components are then simultaneously transmitted.

The requirements for a phosphor to be used in a "flying-spot" cathode ray tube are extremely fast decay, broad emission spectrum, and reasonably high efficiency. Previously, the phosphor which has been mainly used in a luminescent screen in this type of tube has comprised a zinc oxide material. However, although this phosphor emits strongly enough in the green and blue regions of the visible spectrum, its emission in the red is lower than desired.

Because of the red emission deficiency of the above-mentioned zinc oxide phosphor, it is necessary to provide an improved phosphor which has not only desirable short decay and high luminescence efficiency characteristics but broad band emission as well. Such a phosphor is an improved antimony activated magnesium sulfide described in the copending application of S. M. Thomsen, Serial Number 218,327, filed March 30, 1951, and assigned to the assignee of this invention.

A conventional method of applying a phosphor screen to the glass face plate of a cathode ray tube is described in Painter Patent 2,328,292. According to the method described in the patent a quantity of clear liquid is provided as a cushion or settling layer on the glass face plate in a cathode ray tube to be provided with a phosphor screen. A liquid suspension containing a phosphor material to be deposited by settling is distributed over the surface of the cushion layer. The phosphor particles settle through the cushion layer and form as a screen on the face plate. According to general practice, water is used as the settling layer and as the suspending medium for the phosphor material. However, some phosphors, and particularly antimony activated magnesium sulfide, react with water, and the latter phosphor goes through a chemical reaction which results in the production of hydrogen sulfide and the precipitation of magnesium hydroxide. Magnesium hydroxide which is obtained in the reaction is inert with respect to luminescence.

A further problem arises when it is desired to provide the settled phosphor screen with the usual metal coating, for example of aluminum. One method of forming such a coating is described in the Sadowsky application, Serial Number 742,117, filed April 17, 1947, and now Patent No. 2,625,493, and assigned to the assignee of this application. According to this method a water cushion layer is provided above the phosphor screen and an organic film is superposed thereon. The water layer is decanted and the organic film spreads over the phosphor screen to provide a smooth surface on which to deposit a metallic reflecting film. The metal coating is then deposited on the organic film by any conventional method. Clearly, such a method, using a water cushion layer, cannot be employed with a water sensitive phosphor screen.

Since water cannot be readily used with such water sensitive phosphors, organic agents must be used. Another problem results from the use of such organic agents. The usual procedure for forming a phosphor screen includes the provision of a silicate binder, such as potassium silicate, for cementing the phosphor particles to each other and to the supporting medium such as the glass face plate of a cathode ray tube. However silicate binders form precipitates or siliceous gels in the presence of organic agents such as alcohols, acetone and the like. Such a gel is undesirable when present in the settled phosphor screen because it prevents proper operation of the screen. Nitrocellulose binders are also undesirable because they must be baked out at a temperature which is injurious to most phosphors.

Accordingly, the principal object of this invention is to provide a novel method of depositing a screen of water sensitive phosphor material in a cathode ray tube.

Another object of this invention is to provide a novel method of depositing a screen of water-sensitive phosphor material in a cathode ray tube and coating the screen after it has been deposited.

A further object of this invention is to provide a novel method of forming a metallic reflective coating on a water-sensitive phosphor screen.

A further object of this invention is to provide a novel method of forming a screen of water-sensitive phosphor material in a cathode ray tube without the aid of a binder material.

In general, the objects and purposes of this invention are accomplished by settling the water-sensitive phosphor onto the face of the cathode ray tube through an organic medium comprising a solution of an alcohol and an ether. After the screen has been deposited, a coating layer e. g. of a metal such as aluminum is superposed thereon by a method which employs an aqueous cushion layer. Successful metallizing is achieved by protecting the phosphor screen against deleterious effects of the aqueous layer by means of a protective physical coating therefor. I also insure chemical protection for the screen by slowing the rate of phosphor dissociation by providing the proper ion concentration to match one or more of the ion constituents of the phosphor and by lowering the temperature of all constituents.

The invention is described in connection with the drawings wherein:

Fig. 1 shows one type of tube to which the principles of this invention apply;

Fig. 2 shows a cathode ray bulb in the process of being provided with a phosphor screen by the method of this invention;

Fig. 3 represents the tube of Fig. 1 at one stage in the process of aluminizing the phosphor screen;

Fig. 4 shows another step in the aluminizing process;

Fig. 5 is an enlarged sectional view of the aluminized screen;

Figure 6A:
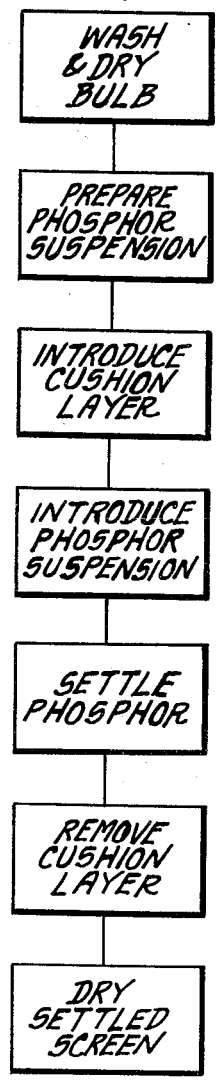
Fig. 6a is a flow chart of the method of the invention for forming a phosphor screen; and, Fig. 6b is a flow chart of the method of the invention for metallizing such a screen.
Figure 6B:
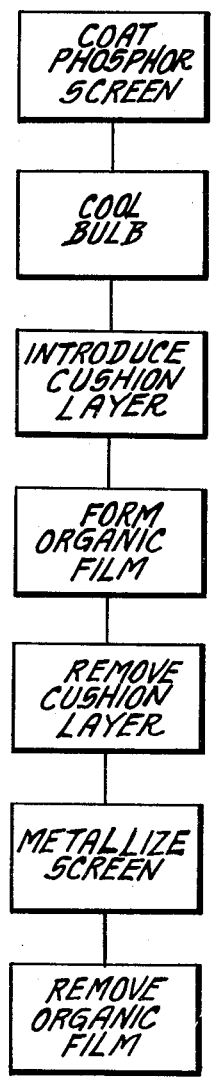

The principles of this invention are applicable to water sensitive phosphors including sulfides or selenides. The series of pertinent materials can be represented by the generalized formula, $M_nS_t$, where M can be one or more cations, and S is either sulfide and/or selenide, while $n$ and $t$ are integers necessary to balance the valences. Specifically M can be aluminum, barium, beryllium, boron, calcium, caesium, chromium, gadolinium, gallium, lanthanum, lithium, magnesium, potassium, strontium, titanium, uranium, yttrium, or any combination of these elements, or any combination of one or more of these cited elements with any other cation.

Referring to Figure 1, there is shown one type of tube to which the principles of the invention are applicable. The tube shown is a cathode ray tube 10 and comprises an envelope or bulb 12 having a neck portion 14 and an expanded bulb portion 16 having an end wall or face plate 18 on which a phosphor screen 20 is deposited according to the principles of the invention. An electron gun 22 mounted in the neck 14 of the envelope 12 is adapted to direct a beam of electrons toward the phosphor screen over which the beam is scanned by magnetic or electrostatic means.

This method of depositing a water sensitive phosphor screen in a cathode ray tube and then aluminizing the deposited phosphor screen is as follows:

Referring to Figures 1, 2 and 6a according to the first step, the cathode ray bulb 12 is washed and thoroughly dried to remove any water which might be adsorbed on the walls thereof. A bake-out at approximately 250° C. followed by several washings with absolute methanol and ether are satisfactory to effect complete drying.

Next, to prepare the phosphor suspension, the phosphor material such as the aforementioned antimony activated magnesium sulfide is ball-milled in chemically pure absolute methanol until the desired particle size of the phosphor has been achieved. In preparing the phosphor for settling a screen in a bulb having a face plate diameter of approximately five inches approximately one gram of phosphor is ball-milled in 100 milliliters of methanol for approximately 15 minutes.

According to the next step (Fig. 2) there is introduced into the bulb 12 a liquid cushion layer 24 comprising a solution of an alcohol, for example methanol, and ten per cent by volume of ethyl ether. For a five-inch bulb, the cushion layer may include approximately 200 milliliters of methanol and 20 milliliters of ethyl ether. These two chemicals provide the best results in this method. However, any other alcohol of the same relative density as methanol, may be used, for example ethanol, propanol, butanol, and the like. Also, almost any other ether may be used, for example, methyl ethyl, methyl, propyl, butyl, propyl butyl and the like. Phosphor particles moving through a settling solution toward the face of a cathode ray tube develop a charge on their surfaces. The charges on adjacent particles have an effect on the distribution of the particles as they settle on the tube face and this effect is one of the factors determining the uniformity of the finally settled screen. Adjacent, similarly charged particles repel each other sufficiently to produce a smooth, uniform-layered screen. Adjacent oppositely charged particles attract each other and tend to agglomerate with the result that the screen is uneven and has layers of uneven thickness. A non-uniform phosphor screen has undesirable light transmitting properties which are to be avoided. According to the invention, the cushion layer 24 of methanol and ethyl ether substantially overcomes any deleterious effects which might result from charges on the surfaces of phosphor particles. The reason for this phenomenon is not completely understood.

Utilizing apparatus similar to that shown in the above-mentioned Painter patent (Figure 2), the desired volume of the phosphor suspension 26 of phosphor particles in methanol is introduced through the spray nozzle 28 into the cathode ray tube bulb 12. For a five inch bulb approximately 35 milliliters of the phosphor-methanol suspension is sufficient to achieve a good screen. For the reasons mentioned above, a binder is not mixed with the phosphor suspension. I allow the phosphor material to settle through the cushion layer to the face 18 of the tube where it becomes deposited as a screen 20.

The next step comprises removing the cushion layer 24 from the bulb. For this operation, the cathode ray tube bulb or envelope is tilted between five and ten degrees and the layer is slowly decanted or siphoned therefrom. Because a binder has not been mixed with the phosphor material, tilting the tube to a greater extent might cause the deposited phosphor particles to slip and "snow-ball" down the face of the envelope. After the cushion layer has been removed, the settled screen is dried with filtered air. After the deposited screen has been thoroughly dried, the tube may be processed to completion in the usual fashion. If the phosphor screen is to be further treated, as by metallizing, before the tube is completed, the screen must not be exposed to the atmosphere because of the tendency of the deposited material to absorb moisture from the air. However, if the screened bulb is stored in a cold environment, for example, in a refrigerator, it may be thus maintained for at least twelve hours without apparent loss of efficiency.

The quantities of materials set forth above may be suitably scaled when a phosphor screen is to be formed in other size cathode ray tubes.

The novel metallizing or aluminizing procedure of the invention is as follows: Referring to Figures 3, 4, 5, and 6b after the phosphor material has been deposited as outlined above and the bulb 12 and screen 20 have been dried, a 15% to 25% aqueous solution of pure potassium silicate or sodium silicate is introduced. Such agent is allowed merely to wet the screen and form a thin silicate layer 30 and then it is quickly but carefully removed by decantation. Pure agents must be used because the presence of metallic impurities, particularly iron, in the silicate solution, results in the formation of black metallic sulfides which contaminate and destroy the screen. The silicate layer 30 is dried with filtered air and baked for fifteen minutes to an hour at a temperature in the range of 100° C. to 200° C. Such a silicate layer provides a hard protective coating for the water sensitive phosphor during the rest of the process.

Next, the screened bulb is chilled to a temperature on the order of 0° C. in a slurry of water and ice 32 and there is introduced into the bulb a layer 34 of distilled ice water to which sodium sulfide or some other source of the proper phosphor anion has been added to approximately the saturation point. This step lowers the materials to a temperature at which chemical activity is considerably reduced and provides a concentration of sulfide or other ions which considerably slows the dissociation of the magnesium sulfide or other phosphor material. The near freezing temperature of all parts and solutions is maintained throughout the remainder of the process.

Next, a film 36 of organic material is deposited on the phosphor screen by any suitable method. One such method is that described in the pending application of Sadowsky Serial No. 742,117, filed April 17, 1947, and now Patent No. 2,625,493. According to the method a drop of nitrocellulose in a volatile solvent is deposited on the ice water layer from a pipette 38. The drop is allowed to spread until it completely covers the ice water-sodium sulfide layer 34 in the bulb 12.

Next, the ice water and sodium sulfide mixture 34 is removed from the tube according to the above-mentioned Sadowsky method by tilting the bulb 12 and decanting as shown in Figure 4. The silicate layer 30 is not disturbed by this operation. The remaining organic film-covered screen is then air dried. Finally the desired layer of aluminum 40 is evaporated in vacuo onto the screen in conventional fashion. One method is shown in R. R. Law United States Patent 2,303,563. Finally, the organic film is removed by the usual baking operation.

The essential elements of this method which prevent the decomposition of the phosphor material during aluminizing comprise a chemical means and a physical means. Chemical protection is provided by hindering dissociation of the screen by maintaining all parts and solutions at low temperatures and by maintaining a high concentration of sulfide ions in the tube. Physical protection is provided by the layer of pure potassium or sodium silicate deposited on the phosphor screen.

What I claim is:

1. The method of forming a phosphor screen on a support member, said method comprising the steps of providing above said member a layer of a mixture of an alcohol and an ether, said alcohol having a density near that of methanol, distributing a suspension of finely divided antimony activated magnesium sulfide phosphor particles over said layer, settling the phosphor particles through said layer, and removing said layer from above said member.

2. The method of forming a phosphor screen on a support member, said method comprising the steps of providing above said member a layer of a mixture of an alcohol selected from the group consisting of methanol, ethanol, propanol and butanol, and an ether, distributing a suspension of finely divided antimony activated magnesium sulfide phosphor particles over said layer, settling the phosphor particles through said layer, and removing said layer from above said member.

3. The method of forming a water-sensitive phosphor screen on a support member, said method comprising the steps of providing above said member a layer of a mixture of methanol and five percent to fifteen percent by volume of ethyl ether, distributing a suspension of finely divided antimony activated magnesium sulfide phosphor particles over said layer, settling said phosphor particles through said layer, and removing said layer from above said member.

4. The method of coating a phosphor screen comprising coating a layer of an alkaline earth silicate over said screen, cooling the screen and its container to approximately 0° C. to decrease the rate of dissociation of said screen, providing above said screen a layer of a mixture of water having a temperature of about 0° C. and a salt having the same anion as said phosphor material, providing over said layer a film formed from a water-immiscible organic material, removing said layer whereby said organic film is disposed directly on said phosphor screen, and depositing a coating on said organic film.

5. The method of providing a smooth coating over a water-sensitive phosphor screen on a support member, said method comprising the steps of providing an aqueous solution of a pure alkaline earth silicate over said screen, allowing said solution to wet said screen and immediately removing said solution from above said screen thereby leaving a protective coating of said silicate on said screen, lowering the temperature of said support member and said coated screen to approximately 0° C. to decrease the rate of dissociation of said screen, providing over said screen a mixture of water having a temperature of about 0° C. and a salt having the same anion of which the phosphor is composed to slow the rate of dissociation of said screen, spreading over said mixture a film formed from a water-immiscible organic material, removing said ice water and salt mixture, and depositing a coating on said organic film.

6. The method of providing a smooth reflective coating over a water-sensitive phosphor screen in a cathode ray bulb, said method comprising the steps of introducing an aqueous solution of a pure alkaline earth silicate over said screen, allowing said solution to wet said screen and immediately removing said solution from the bulb, lowering the temperature of the bulb and its contents to approximately 0° C., introducing into said bulb a mixture of water having a temperature of about 0° C. and a salt having the same anion of which the phosphor is composed, spreading an organic film over said mixture, said film being formed from a water-immiscible organic material, removing said ice water and salt mixture, drying the remaining chemicals in said bulb and depositing a layer of aluminum on said organic film.

7. The method of forming a water-sensitive phosphor screen in a cathode ray bulb comprising the steps of introducing into said bulb a layer of a mixture of an alcohol and an ether, said alcohol having a density near that of methanol, distributing a suspension of finely divided antimony activated magnesium sulfide phosphor over said layer, allowing said phosphor to settle through said layer and deposit as a screen, removing said layer from said bulb, drying said deposited phosphor screen, introducing an aqueous solution of a pure alkaline earth silicate over said screen, allowing said solution to wet said screen and immediately removing said solution from the bulb, lowering the temperature of the bulb and its contents, introducing a mixture of ice water and sulfide ions into said bulb, spreading an organic film over said mixture, said film being formed from a water-immiscible organic material, removing said mixture of ice water and sulfide ions, and depositing a reflective metal coating on said organic film.

8. The method of forming a water-sensitive phosphor screen in a cathode ray bulb comprising the steps of introducing into said bulb a layer of a mixture of methanol and five per cent to fifteen per cent by volume of ethyl ether into said bulb, distributing a suspension of finely divided antimony activated magnesium sulfide phosphor over said layer, allowing said phosphor to settle through said layer and deposit as a screen, removing said layer from said bulb, drying said deposited phosphor screen, introducing an aqueous solution of pure potassium silicate over said screen, allowing said solution to wet said screen and immediately removing said solution from the bulb, lowering the temperature of the bulb and its contents to approximately 0° C., introducing a mixture of ice water and sulfide ions into said bulb, spreading an organic film over said mixture, said film being formed from a water-immiscible organic material, removing said mixture of ice water and sulfide ions, drying the remaining chemicals in said bulb and depositing a reflective metal coating on said organic film.

9. The method of forming a phosphor screen in a cathode ray bulb comprising the steps of introducing a layer of a mixture of methanol and five per cent to fifteen per cent by volume of ethyl ether into said bulb, distributing a suspension of finely divided antimony activated magnesium sulfide phosphor over said layer, allowing said phosphor to settle through said layer and deposit as a screen, tilting said bulb between five and ten degrees and removing said layer from said bulb, drying said deposited phosphor screen, introducing an aqueous solution of pure potassium silicate over said screen, allowing said solution to wet said screen and immediately removing said solution from the bulb, lowering the temperature of the bulb and its contents to approximately 0° C., introducing a mixture of ice water and sulfide ions into said bulb, spreading an organic film over said mixture, said film being formed from a water-immiscible organic material, removing said mixture of ice water and sulfide ions, drying the remaining chemicals in said bulb and depositing a layer of aluminum on said organic film.

References Cited in the file of this patent

UNITED STATES PATENTS

| | | |
|---|---|---|
| 2,328,292 | Painter | Aug. 31, 1943 |
| 2,374,310 | Schaefer | Apr. 24, 1945 |
| 2,421,208 | Leverenz | May 27, 1947 |
| 2,421,979 | Bachman et al. | June 10, 1947 |
| 2,441,217 | Windsor | May 11, 1948 |
| 2,451,590 | Tidik et al. | Oct. 19, 1948 |
| 2,597,617 | Campbell | May 20, 1952 |